United States Patent
Valentine et al.

(10) Patent No.: US 10,360,910 B2
(45) Date of Patent: Jul. 23, 2019

(54) AUTOMATIC SPEECH RECOGNITION (ASR) UTILIZING GPS AND SENSOR DATA

(71) Applicant: Garmin Switzerland GmbH, Schaffhausen (CH)

(72) Inventors: Matthew F. Valentine, Chapel Hill, NC (US); Benjamin D. Gavula, Overland Park, KS (US); Tyler J. Harms, Gardner, KS (US)

(73) Assignee: Garmin Switzerland GmbH (CH)

( * ) Notice: Subject to any disclaimer, the term of this patent is extended or adjusted under 35 U.S.C. 154(b) by 151 days.

(21) Appl. No.: 15/687,228

(22) Filed: Aug. 25, 2017

(65) Prior Publication Data

US 2018/0061409 A1     Mar. 1, 2018

Related U.S. Application Data

(60) Provisional application No. 62/380,564, filed on Aug. 29, 2016.

(51) Int. Cl.
*G10L 15/00*     (2013.01)
*G10L 15/22*     (2006.01)
(Continued)

(52) U.S. Cl.
CPC .......... *G10L 15/22* (2013.01); *G10L 15/1815* (2013.01); *G10L 15/20* (2013.01); *G10L 15/24* (2013.01); *H04W 52/0267* (2013.01); *G06F 3/167* (2013.01); *G10L 15/02* (2013.01); *G10L 15/063* (2013.01); *G10L 15/08* (2013.01); *G10L 15/183* (2013.01); *G10L 2015/088* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,951,079 A | 8/1990 | Hoshino et al. | 354/412 |
| 7,415,416 B2 | 8/2008 | Rees | 704/275 |

(Continued)

OTHER PUBLICATIONS

Printout from https://www.apple.com/ios/siri/ dated prior to Aug. 25, 2017.

(Continued)

*Primary Examiner* — Vu B Hang
(74) *Attorney, Agent, or Firm* — Samuel M. Korte; Max M. Ali

(57) ABSTRACT

An automatic speech recognition (ASR) system is disclosed that compensates for different noise environments and types of speech. The ASR system may be implemented as part of an action camera that collects status data, such as geographic location data and/or sensor data. The ASR system may perform speech recognition using an acoustic model and a speech recognition model, which are trained for operation in specific noise environments and/or for specific types of speech. The computing device may categorize a current status of the action camera, as indicated by the status data, into an action profile, which may represent a particular activity (e.g., running, cycling, etc.) or state of the computing device. The computing device may dynamically switch the acoustic model and/or the speech recognition model to compensate for anticipated changes in the noise environment and speech based upon the action profile to facilitate the recognition of various action camera functions.

20 Claims, 4 Drawing Sheets

(51) Int. Cl.
*H04W 52/02* (2009.01)
*G10L 15/18* (2013.01)
*G10L 15/24* (2013.01)
*G10L 15/20* (2006.01)
*G10L 15/06* (2013.01)
*H04N 5/232* (2006.01)
*H04M 1/725* (2006.01)
*G10L 15/08* (2006.01)
*G06F 3/16* (2006.01)
*G10L 15/183* (2013.01)
*G10L 15/02* (2006.01)

(52) U.S. Cl.
CPC ... *G10L 2015/223* (2013.01); *H04M 1/72569* (2013.01); *H04M 1/72572* (2013.01); *H04M 2250/58* (2013.01); *H04M 2250/74* (2013.01); *H04N 5/23216* (2013.01); *Y02D 70/00* (2018.01); *Y02D 70/10* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/20* (2018.01); *Y02D 70/26* (2018.01)

(56) References Cited

U.S. PATENT DOCUMENTS

| | | | |
|---|---|---|---|
| 8,897,634 B2 | 11/2014 | Konicek | 396/56 |
| 9,031,847 B2 | 5/2015 | Sarin et al. | |
| 2005/0075881 A1 | 4/2005 | Rigazio et al. | 704/270 |
| 2005/0128311 A1 | 6/2005 | Rees et al. | 348/211.99 |

OTHER PUBLICATIONS

Printout from https://www.nuance.com/mobile/speech-recognition-solutions/vocon-sse.html dated prior to Aug. 25, 2017.
Printout from https://www.nuance.com/mobile/speech-recognition-solutions/vocon-hybrid.html dated prior to Aug. 25, 2017.
Printout from https://www.amazon.com/Armazon-Echo-And-Alexa-Devices/b?ie=UTF8&node=9818047011 dated prior to Aug. 25, 2017.
Printout from https://developer.amazon.com/alexa-voice-service/dev-kits/amazon-7-mic dated prior to Aug. 25, 2017.
Printout from https://developer.amazon.com/blogs/alexa/post/b80b4669-2675-4752-a171-fa6aaa7e5aff/bringing-far-field-voice-technology-from-the-amazon-echo-to-third-party-devices dated prior to Aug. 25, 2017.
Printout from https://developer.android.com/reference/android/speech/SpeechRecognizer.html dated Aug. 25, 2017.
Printout from https://arxiv.org/pdf/1601.02553.pdf dated prior to Aug. 25, 2017.

AUTOMATIC SPEECH RECOGNITION (ASR) UTILIZING GPS AND SENSOR DATA

CROSS-REFERENCE TO RELATED APPLICATIONS

The priority benefit of U.S. Provisional Patent Application No. 62/380,564, entitled "Optimizing Automatic Speech Recognition in Varied Environments," filed on Aug. 29, 2016, is claimed and the disclosure of which is hereby incorporated by reference in its entirety.

TECHNICAL FIELD

The present disclosure relates generally to automatic speech recognition (ASR) and, more particularly, to an ASR system that compensates for different noise environments and types of speech by leveraging geographic location data and/or sensor data.

BACKGROUND

Computing devices are increasingly using automatic speech recognition (ASR) systems in conjunction with text-to-speech (TTS) systems to function as a type of user interface. For example, a computing device may listen for spoken commands via a microphone, which are recognized by the computing device to perform certain type of functions. Furthermore, the computing device may provide feedback or prompt the user in the form of simulated speech via a speaker. In doing so, a user may interact with the computing device without providing tactile user input or looking at a display, which may obviate the need for a display entirely and allow the user to interact with the computing device in a hands-free manner.

To recognize speech, ASR systems traditionally implement ASR algorithms that are trained in accordance with some level of expected noise and type of speech, which typically involves establishing a set of "tuning parameters" that are static and do not change. For example, an ASR system in a vehicle navigation device may implement ASR algorithms for a particular language or dialect, and thus may be trained for corresponding noise characteristics associated with its intended use, i.e., vehicle cabins, which are a relatively quiet, stable, and predictable. As a result, if the environment deviates from those which the ASR algorithms were originally trained, the ASR system may fail to properly recognize speech. For instance, the vehicle navigation device described above may work well while the vehicle cabin remains relatively quiet (i.e., similar to how the algorithm was originally trained), but fail to recognize speech properly when the windows are open while driving and the vehicle cabin is noisier.

Moreover, ASR systems may experience false accepts (FAs) and false rejects (FRs) as part of their operation. FAs are associated with an incorrect identification of a particular word or phrase, whereas FRs are associated with the ASR system failing to recognize a particular word or phrase, which commonly occurs in noisier environments. Therefore, ASR algorithms are typically tuned to either minimize FAs (for quiet environments), or to minimize FRs (for noisy environments), which are different goals requiring different sets of tuning parameters. Because conventional ASR algorithms implement a single algorithm for a single type of noise environment and speech, a compromise must be struck between these two goals, preventing the ASR system from being truly optimized across different environments.

Furthermore, conventional ASR systems may implement two different speech recognizers to identify different portions of speech. For instance, a trigger speech recognizer may be implemented to listen for a "wake word." Once the wake word is recognized, a command speech recognizer may be implemented to recognize subsequently spoken words. However, even when separate speech recognizers are implemented, both speech recognizers rely on the same set of ASR algorithms, which are tuned to the same, static noise environment and type of speech. Therefore, the FAs and FRs for the trigger speech recognizer and the command speech recognizer cannot be independently minimized.

As a result, current ASR systems, and the way the ASR algorithms are implemented in accordance with such systems, have several drawbacks and limitations.

SUMMARY

The present disclosure is directed to technology that encompasses automatic speech recognition (ASR) systems. In an embodiment, the ASR systems described herein may be implemented in a computing device, such as an action camera, for example, or other suitable computing device that may be mounted closely to or worn by a user while performing various types of activities. The user may interact with the computing device in various ways via a voice user interface (VUI), which includes an ASR system in conjunction with TTS to control various functions of the computing device. These functions may change based upon the particular computing device in which the ASR system described herein is implemented. For instance, the speech recognition functionality provided by the ASR embodiments as described herein may cause the computing device to change camera settings, record video, start, stop, and pause playback, add a waypoint to a current navigation route, change settings, etc. In addition to controlling the computing device, the user may interact with the VUI to retrieve activity information such as geographic location data, fitness data, vehicle data, and device settings.

The computing device may thus be used for various activities such as cycling, running, rock climbing, skiing, etc., and be subjected to varying noise environments based upon the type of activity being performed. For example, a user may use an action camera when running or cycling, and the action camera microphone may be exposed to additional wind noise depending on the orientation and speed of the action camera while doing so. To provide another example, other factors such as vibration and running cadence may introduce noise that changes over time. As a result, the noise environment will change based upon the particular activity for which the computing device is used. Moreover, the user's speech pattern may be different when at rest versus when performing different types of exercises, and change even more so while the same type of exercise is performed in a more strenuous manner.

To remedy this, the ASR system may collect geographic location data and/or sensor data (collectively referred to herein as "status data") to identify changes in a state of the action camera, or another computing device in which the ASR system is implemented. The status data may also indicate the status of the user via biometric information that may be included as part of the collected sensor data. Using this information, embodiments include the ASR system predicting accompanying changes to the noise environment and/or the user's speech, and modifying various portions of the ASR algorithms to dynamically compensate for such changes.

To do so, the embodiments described herein include categorizing a current state of the computing device into a particular action profile based upon the collected status data to estimate the noise environment, changes in the user's speech, and/or a state of the computing device. In some instances, this may additionally or alternatively include listening to the noise environment via the microphone, although this is not required. For example, an action profile may include orientation metrics, movement metrics (e.g., vibration, rotation, velocity, etc.), biometric information, etc., associated with a particular type of user activity, the user's strain during such activity, and/or the position of the computing device during such activity.

The embodiments described herein implement a dynamic ASR system by selecting from several acoustic models and/or speech recognition models based upon the identified action profile and, thus, the likely noise environment and type of speech that are associated with the action profile. Generally speaking, each of the different acoustic models is associated with one or more acoustic tuning parameters, which correspond to an environment with unique noise characteristics. In other words, the acoustic models represent training data for different types of noise environments. Moreover, each of the different speech recognition models represents a particular breadth and depth of search for a particular meaning of phonetic terms that are identified and output by a corresponding acoustic model. Still further, the ASR system may implement other tuning parameters, referred to herein as ASR tuning parameters, which may also be dynamically changed to adjust to changes in the noise environment, type of speech, and/or state of the computing device.

Therefore, once the action profile is identified, the ASR system described herein acts to compensate for different noise environments and types of speech by using a specific acoustic model, speech recognition model, and/or other selected tuning parameters for a specific action profile. The computing device may also track changes in the status data over time and categorize the computing device into new action profiles when applicable. In doing so, the acoustic model, speech recognition model, and/or other selected tuning parameters may be dynamically switched during ASR runtime execution to compensate for additional changes to the noise environment and the user's speech. In this way, the recognition of various action camera functions via ASR may be achieved in various noise environments and while the user is partaking in various types of activities. This flexibility may further be extended to independently control different speech recognizers (e.g., a trigger speech recognizer and command speech recognizer) by separately selecting acoustic models, speech recognition models, and/or other selected tuning parameters for each one.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the Figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

Figure 1:
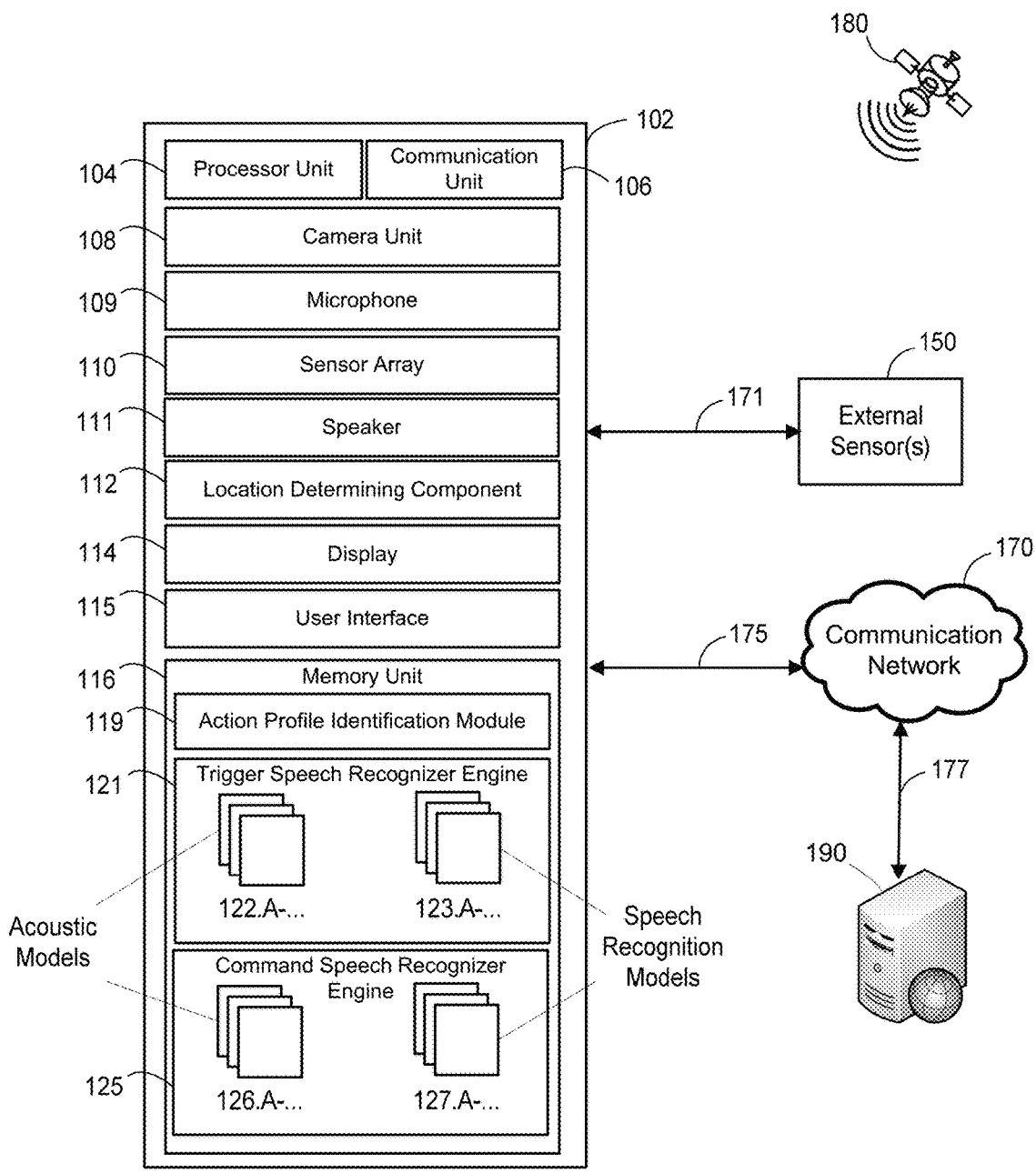
FIG. 1 is a block diagram illustrating an example computing device environment 100 in accordance with embodiments of the technology.

FIG. 1 is a block diagram illustrating an example computing device environment 100 in accordance with embodiments of the technology. Computing device environment 100 is shown in FIG. 1 as including a computing device 102, one or more external sensors 150, a communication network 170, a plurality of satellites 180, and one or more backend components 190. In embodiments, computing device 102 may include a microphone 109 configured to receive audible speech and a speaker 111 configured to output audible signals. However, embodiments may include a greater number or a lesser number of components as shown in FIG. 1. For example, in some embodiments, computing device 102 may act as a standalone device and not require communications with one or more external sensors 150 or communication network 170 to provide the functionality detailed herein, and thus one or more of one or more external sensors 150, communication network 170, and/or one or more backend components 190 may be omitted. In other embodiments, computing device 102 may communicate with and/or work in conjunction with one or more external sensors 150, communication network 170, and/or one or more backend components 190, to provide and/or supplement the functionality detailed herein.

In various embodiments, the one or more external sensors 150 may include any suitable number and/or type of sensors, which may provide identical or similar functionality as the sensors described here with reference to sensor array 108 and/or the functionality provided by the location determining component 112. However, in embodiments in which the one or more external sensors 150 are present, these sensors may be worn by a user to provide sensor data via a more convenient manner or of a different type than one or more sensors implemented via sensor array 108. In an embodiment, the one or more external sensors 150 may be configured to communicate with the computing device 102 to transmit sensor data to the computing device 102 and/or receive any suitable form of communications from the computing device 102. For example, the one or more external sensors 150 may include a heart rate monitor with a battery that operates independently of computing device 102. In such a case, this external sensor may transmit data (e.g., a user's heart rate) and/or communicate with the computing device 102 using any suitable number and/or type of communication protocols via link 171, which may represent any suitable number and/or type of wired and/or wireless links.

To facilitate the exchange of data, the computing device 102, the one or more external sensors 150, the communication network 170, and/or the one or more backend components 190 may be configured to support communications in accordance with any suitable number and/or type of wired and/or wireless communication protocols. Examples of suitable communication protocols may include personal area network (PAN) communication protocols (e.g., BLUETOOTH), Wi-Fi communication protocols, radio frequency identification (RFID) and/or a near field communication (NFC) protocols, cellular communication protocols, Internet communication protocols (e.g., Transmission Control Protocol (TCP) and Internet Protocol (IP)), etc. Additional examples of communication protocols are further discussed herein with reference to the operation of the computing device 102.

For example, communication link 175 may represent one or more wired communication links (e.g., a cable connection such as universal serial bus (USB) connection to an Internet-enabled computer) and/or one or more wireless communication links (e.g., a Wi-Fi connection) between the computing device 102 and communication network 170. To this end, the communication network 170 may include any suitable number of nodes, additional wired and/or wireless networks, etc., in various embodiments. For example, in an embodiment, communication network 170 may be implemented with any suitable number of base stations, landline connections, internet service provider (ISP) backbone connections, satellite links, public switched telephone network (PSTN) connections, local area networks (LANs), metropolitan area networks (MANs), wide area networks (WANs), any suitable combination of local and/or external network connections, etc. To provide further examples, communication network 170 may include wired telephone and/or cable hardware, satellite, cellular phone communication networks, etc. In various embodiments, communication network 170 may provide the computing device 102 with connectivity to network services, such as Internet services, for example, to facilitate communications with one or more backend components 190.

In an embodiment, one or more backend components 190 may include any suitable number and/or type of computing devices configured to communicate and/or exchange data with the computing device 102. For example, one or more backend components 190 may receive and/or store data received from computing device 102. Furthermore, embodiments include one or more backend components 190 performing any suitable portion of functions that would otherwise be performed by the computing device 102, as further described herein. For instance, the one or more backend components 190 may receive digital audio sampled by the computing device 102, perform ASR, determine matching phrases or words, identify commands, etc., and transmit this information back to the computing device 102. In this way, the computing device 102 may offload a portion of (or the entirety of) ASR processing functions to the one or more backend components 190. Such embodiments may be particularly useful, for example, when a computing device 102 is used in an environment in which Internet connectivity is available, the ASR algorithms are particularly complex, the ASR system uses several acoustic and/or speech recognition models, etc. In various embodiments, one or more backend components 190 may be implemented as one or more servers (e.g., specialized servers such as web servers), connected computing devices, databases, storage devices, etc.

As shown in FIG. 1, the computing device 102 includes a processor unit 104, a communication unit 106, a camera unit 108, a sensor array 110, a location-determining component 112, a display 114, a user interface 115, and a memory unit 116. Embodiments include the computing device 102 implementing more, less, or alternative components as those shown in FIG. 1, including those discussed elsewhere herein. Again, the computing device 102 may be implemented as any suitable type of computing device that is configured to receive audio containing audible speech, recognize the speech to identify specific words or phrases, and perform various commands once a particular word or phrase is identified. In embodiments, the computing device 102 may be implemented as a navigation device, an action camera, a smart watch, or any other suitable type of portable device. In some embodiments, the computing device 102 may be worn by a user while performing various activities, whereas other embodiments include the computing device 102 being mounted in place (e.g., inside of a vehicle, on a bicycle, etc.). In any event, the computing device 102 may utilize an ASR system to allow a user to control various aspects of its operation, which is further discussed below.

Processor unit 104 may be implemented as any suitable type and/or number of processors, such as a host processor of the computing device 102, for example. To provide additional examples, processor unit 104 may be implemented as an application specific integrated circuit (ASIC), an embedded processor, a central processing unit associated with the computing device 102, etc. Processor unit 104 may be coupled with and/or otherwise configured to communicate, control, operate in conjunction with, and/or affect operation of one or more of communication unit 106, camera unit 108, sensor array 110, location determining component 112, display 114, and/or memory unit 116 via one or more wired and/or wireless interconnections, such as any suitable number of data and/or address buses, for example. Additionally or alternatively, one or more of communication unit 106, camera unit 108, sensor array 110, location determining component 112, display 114, and/or memory unit 116 may be coupled to or otherwise configured to operate in conjunction with one another in conjunction with or independently of processor unit 104. The interconnections used to support such interoperability amongst the various components of the computing device 102 are not shown in FIG. 1 for purposes of brevity.

Processor unit 104 may be configured to retrieve, process, and/or analyze data stored in memory unit 116, to store data to memory unit 116, to replace data stored in memory unit 116, and to support an ASR system to recognize audible speech. Additionally, processor unit 104 may be configured to identify a phrase or word as a particular command that is used to control a setting or operation of the computing device 102, and to execute a corresponding command function once recognized. Additional details associated with the ASR system and the execution of command functions are further discussed below.

Communication unit 106 may be configured to support any suitable number and/or type of communication protocols to facilitate communications between the computing device 102, the one or more external sensors 150, the communication network 170, and/or the one or more backend components 190 in accordance with any suitable number and/or type of wired and/or wireless communication protocols. Communication unit 106 may thus be implemented with any suitable combination of hardware and/or software to facilitate such functionality. For example, communication unit 106 may be implemented with any number of wired and/or wireless transceivers, ports, connectors, antennas, etc. Examples of wireless communication standards that may be implemented by the computing device 102 include, but are not limited to, communications according to: one or more standard of the Institute of Electrical and Electronics Engineers (IEEE), such as 802.11 or 802.16 (Wi-Max) standards; Wi-Fi standards promulgated by the Wi-Fi Alliance; ZigBee standards promulgated by the ZigBee Alliance; Bluetooth standards promulgated by the Bluetooth Special Interest Group; ANT or ANT+ standards promulgated by Dynastream Innovations, Inc.; and so on.

Additionally or alternatively, communication unit 106 may be configured to support communications between the computing device 102 and one or more other computing devices not shown in FIG. 1 for purposes of brevity. One or more communications protocols may support remote audio input to the computing device, which can supply speech to the ASR algorithms (e.g. a Bluetooth headset with microphone & speaker). As another example, the computing device 102 may receive geographic location data from another component (e.g., a Global Positioning System (GPS) receiver) that is external to the computing device 102 in addition to or instead of the geographic location data generated by location-determining component 112 (as further discussed below). In any event, communication unit 106 may facilitate the computing device 102 receiving data from any suitable number and type of external and/or internal components to facilitate the various functions of the embodiments as described herein.

The computing device 102 may include a camera unit 108, which may include any suitable number and/or type of cameras. Each camera included in camera unit 108 may be configured to capture image data and/or video data over one or more consecutive frames, including capturing live video. Each camera included in camera unit 108 may include any suitable combination of hardware and/or software such as image sensors, optical stabilizers, image buffers, frame buffers, charge-coupled devices (CCDs), complementary metal oxide semiconductor (CMOS) devices, etc., to facilitate such functionality. Each camera included in camera unit 108 may store the image and/or video data to any suitable portion of memory unit 116 and/or transmit the image and/or video data to another suitable device (e.g. the one or more backend components 190 via the communication network 170).

Sensor array 110 may be implemented as any suitable number and/or type of sensors configured to measure, monitor, and/or quantify one or more physical characteristics. These sensor measurements may result in the acquisition and/or generation of different types of sensor data, for example, which may be processed by processor unit 104. For example, sensor array 110 may include one or more accelerometers, gyroscopes (e.g., rate gyroscopes), compasses, speedometers, magnetometers, barometers, thermometers, proximity sensors, light sensors (e.g., light intensity detectors), photodetectors, photoresistors, photodiodes, Hall Effect sensors, electromagnetic radiation sensors (e.g., infrared and/or ultraviolet radiation sensors), ultrasonic and/or infrared range detectors, humistors, hygrometers, altimeters, biometrics sensors (e.g., heart rate monitors, blood pressure monitors, skin temperature monitors), etc. Sensor array 110 may be configured to sample sensor measurements and/or to generate sensor data continuously or in accordance with any suitable recurring schedule, such as, for example, on the order of milliseconds (e.g., between 250-500 Hz), once per every second, once every 5 seconds, etc. Thus, the one or more components of the sensor array 112 may generate sensor data that is stored over time in memory unit 116, which may be monitored or tracked via the processor unit 102.

Location-determining component 112 may receive location signals transmitted by one or more position data platforms and/or position data transmitters, such as GPS satellites. More particularly, location-determining component 112 may manage and process signal data received from GPS satellites via a GPS receiver. Location-determining component 112 may thus determine a geographic position of the computing device 102 by processing the received signal data, which may include various data suitable for use in position determination, such as timing signals, ranging signals, ephemerides, almanacs, and so forth. Location-determining component 112 may be configured to continuously determine the geographic position of the computing device 102, or do so in accordance with a particular recurring schedule such as several times per second, once every second, once every 5 seconds, etc. In this way, the geographic position of the computing device 102 may be stored over time in memory unit 116 as geographic location data, which may be monitored or tracked via the processor unit 102.

Location-determining component 212 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide position/location information, timing information, speed information, and a variety of other navigation-related data. Accordingly, location-determining component 112 may be configured in a variety of ways to perform a wide variety of functions. For example, location-determining component 112 may be configured for cycling; however, location-determining component 112 may also be configured for hiking or other on-foot navigation such as skiing, or for vehicle navigation or tracking.

Location-determining component 112 may also use signal data received via a GPS receiver in combination with map data that is stored in memory unit 116 to generate navigation instructions (e.g., turn-by-turn instructions to an input destination or POI), show a current position on a map, and so on. Location-determining component 112 may include one or more antennas to receive signal data. Location-determining component 112 may also provide other position-determining functionality, such as to determine an average speed, calculate an arrival time, and so on.

It should be understood that a wide variety of positioning systems other than GPS may be employed, such as other satellite systems (e.g., GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, accelerometers and magnetometers), use of "dead reckoning" techniques, and so on. In other examples, positioning-determining functionality may be implemented through the use of predictive algorithms, utilizing previously collected positioning data for a specific path or trail.

Display 114 may be implemented as any suitable type of display configured to facilitate user interaction, such as a touchscreen, and/or display data to a user. In various embodiments, display 114 may be configured to work in conjunction with user interface 115 and/or processor unit 104 to detect user inputs upon a user interacting with one or more displayed interactive icons or other graphics presented on display 114. For example, display 114 may be implemented as a capacitive touch screen display or a resistive touch screen display and may include displays such as plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), etc., or combinations thereof.

User interface 115 may be a graphical interface configured to facilitate user interaction with the computing device 102 and/or to provide feedback to a user. In an embodiment, a user may interact with user interface 115 to change various modes of operation, to initiate certain functions, to modify settings, set options, etc., which are further discussed below. For example, user interface 115 may include a user-input device such as one or more interactive touchscreen portions of display 114 (e.g., an on-screen "soft" keyboard, buttons, menus, switches, etc.) displayed on display 114, physical buttons, switches, knobs, etc., integrated as part of computing device 102 that may have dedicated and/or multi-purpose functionality, etc.

Additionally or alternatively, embodiments include the user interface 115 representing a software construct in addition to, in conjunction with, or instead of a hardware one, and therefore user interface 115 may additionally or alternatively be associated with instructions stored in memory unit 116, which act to correlate various commands and functions to specifically-recognized words and phrases, as discussed herein. In this way, once processor unit 104 identifies speech as matching a known word or phrase that is associated with a command or function, the processor unit 104 may work in conjunction with user interface 115 to carry out this function and effectuate a change in the computing device 102.

In accordance with embodiments in which the user interface 115 functions to execute specific commands in response to recognized speech, the user interface 115 may facilitate a voice user interface (VUI) for the computing device 102. Thus, embodiments in which a VUI is implemented by the computing device, other hardware typically associated with receiving user input and presenting feedback to the user (e.g., displays) may be omitted, thereby simplifying the overall design of the computing device 102 (and reducing the size and cost) while doing so.

For example, the VUI may enable a user to specify any suitable number and/or type of commands to control the operation, settings, and functionality of the computing device 102. Moreover, the VUI may utilize one or more speakers 111 implemented by the computing device 102 to provide feedback to the user in response to received commands, and may leverage a text-to-speech (TTS) system when applicable or otherwise relevant to do so. For instance, a user may change camera settings by speaking the appropriate words or phrases associated with these functions. As the speech is recognized, the VUI may provide feedback via TTS in the form of a current menu or sub-menu, a confirmation that a setting has changed, general help, a list of available commands, etc. Thus, once a meaning for a recognized word is identified via processor unit 104 executing trigger speech recognizer engine 121 and/or command speech recognizer engine 125, as further discussed herein, processor 104 may execute a corresponding computing device function.

The memory unit 116 is an example of device-readable storage media that provides storage functionality to store various data associated with the operation of the computing device 102, such as software programs, recognizer engines, and modules discussed herein, or other data to instruct the processor unit 104 and other elements of the computing device 102 to perform the techniques described herein. Although a single memory unit 116 is shown in FIG. 1, a wide variety of types and combinations of memory may be employed. The memory unit 116 may be integral with the processor unit 104, stand-alone memory, or a combination of both. The memory unit 116 may include, for example, removable and non-removable memory elements such as random access memory (RAM), read-only memory (ROM), Flash (e.g., secure digital (SD) card, mini-SD card, micro-SD card), solid-state disk (SSD), magnetic, optical, universal serial bus (USB) memory devices, and so forth.

Moreover, in accordance with various embodiments, memory unit 116 may be a computer-readable non-transitory storage device that may include any suitable combination of volatile (e.g., a random access memory (RAM), or non-volatile memory (e.g., battery-backed RAM, FLASH, etc.). Memory unit 116 may be configured to store instructions executable on processor unit 104. These instructions may include machine readable instructions that, when executed by processor unit 104, cause processor unit 104 to perform various acts and/or to cause the computing device 102 to perform various acts, as described herein. Memory unit 116 may also be configured to store any other suitable data used in by the computing device 102 to perform various acts, such as status data discussed herein, captured video, one or more acoustic models, one or more speech recognition modules, etc.

Action profile identification module 119 is a region of memory unit 116 configured to store instructions, that when executed by processor unit 104, cause processor unit 104 to perform various acts in accordance with applicable embodiments as described herein. Again, the computing device 102 may be exposed to varying noise environments as a result of changes in location and/or orientation, and the user's speech pattern may further change in accordance with various types of activity. To identify a particular type of environment caused by such activity, location determining component 112 and one or more sensors included in the sensor array 110 may collect geographic location data and sensor data, respectively, which is stored in memory unit 116 as status data. In an embodiment, action profile identification module 119 includes instructions that, when executed by processor unit 104, cause processor unit 104 to access memory unit 116 to classify the current state of the computing device 102 into a particular action profile such that the appropriate corresponding ASR settings may be used for speech recognition, as further discussed herein.

For example, processor unit 104 may execute instructions stored in action profile identification module 119 to analyze changes in the location of the computing device 102 over time by accessing the geographic location data generated via the location determining component 112 to rack the velocity of the computing device 102. To provide another example, processor unit 104 may execute instructions stored in action profile identification module 119 to analyze sensor data generated by one or more sensors within the sensor array 110 to track changes in the orientation, heading, acceleration, velocity, etc., of the computing device 102 over time. To provide yet another example, processor unit 104 may execute instructions stored in action profile identification module 119 to analyze biometric information that may be part of the sensor data generated by one or more sensors within the sensor array 110 (or external sensors 150) to track changes in a user's heart rate, cadence, perspiration, etc.

In embodiments, any suitable type and number of metrics obtained via an analysis of the status data stored in the memory unit 116, or otherwise obtained via the data sources as discussed herein, may be utilized to identify an action profile. For example, action profiles may be associated with a range of metrics or a particular weighting such that, for specific tracked metrics stored in the memory unit 116, the computing device 102 may be appropriately identified as undergoing a specific type of activity. Moreover, different action profiles may be identified with different types of activities, and different action profiles may be further associated with different physical aspects within a single type of activity. The number and type of action profiles may be tailored to a particular implementation of the computing device 102, with a greater number of action profiles being utilized when the computing device 102 is used over a more diverse range of applications. In some embodiments, processor unit 104 may automatically identify an action profile by analyzing the stored status data and matching the status data to a particular type of activity with similar expected sensor metrics. In other embodiments, a user may identify a particular type of user activity, and the processor unit 104 may further identify a specific action profile from one or more that may be associated with that activity. In any event, the action profiles may constitute one or more specific metrics and/or conditions that, when matched to similar tracked metrics indicated by the status data, allow for a categorization of the computing device 102 to a current environment and/or usage.

To provide an illustrative example, the computing device 102 may be implemented as an in-vehicle navigation device. Thus, some example action profiles associated with such a use of the computing device 102 may be similar to those represented below in Table 1.

TABLE 1

| Action Profile (Driving) | Operating Speed | Trigger Speech Recognizer Engine 121 | Command Speech Recognizer Engine 125 |
|---|---|---|---|
| Action Profile 1 | 0-5 mph | Acoustic Model 122.A Speech Recognition Model 123.A | Acoustic Model 126.A Speech Recognition Model 127.A |
| Action Profile 2 | Above 5 mph to 17 mph | Acoustic Model 122.B Speech Recognition Model 123.B | Acoustic Model 126.B Speech Recognition Model 127.B |
| Action Profile 3 | Above 17 mph | Acoustic Model 122.C Speech Recognition Model 123.C | Acoustic Model 126.C Speech Recognition Model 127.C |

As shown in Table 1, three driving action profiles may be stored in the memory unit 116, each representing a different range of instantaneous velocities associated with the computing device 102. Using these metrics, processor unit 102 may categorize the computing device 102 into a particular action profile by comparing the instantaneous velocity of the computing device 102 (as indicated by the stored status data) to the instantaneous velocity ranges associated with each action profile. In embodiments, the initial identification of particular set of action profiles (e.g., driving, as shown in FIG. 1) may be performed using the same sensor metrics as shown in Table 1 (i.e., speed) or other sensor metrics. For example, the processor unit 104 may analyze acceleration data to first conclude that the computing device 102 is located in a vehicle (e.g., by identifying an acceleration that could not otherwise be possible). Once this activity is identified, the computing device 102 may then classify the computing device 102 into one of the three driving action profiles based upon the instantaneous velocity of the computing device 102.

In embodiments, each action profile also includes information regarding corresponding speech recognition settings that are to be used in accordance with ASR for that particular action profile, which are further discussed below with reference to the operation of the trigger speech recognition engine 121 and the command speech recognition engine 125.

To provide another illustrative example, the computing device 102 may be implemented as an action camera, which is worn by a cyclist or mounted to bicycle handlebars. Thus, some example action profiles associated with such a use of the computing device 102 for cycling may be similar to those represented below in Table 2.

TABLE 2

| Action Profile (Cycling) | Microphone 109 Facing Heading? | Operating Speed | Trigger Speech Recognizer Engine 121 | Command Speech Recognizer Engine 125 |
|---|---|---|---|---|
| Action Profile 1 | Yes | 0-3 mph | Acoustic Model 122.D Speech Recognition Model 123.D | Acoustic Model 126.D Speech Recognition Model 127.D |
| Action Profile 2 | Yes | Above 3 mph to 10 mph | Acoustic Model 122.E Speech Recognition Model 123.E | Acoustic Model 126.E Speech Recognition Model 127.E |
| Action Profile 3 | No | 0-3 mph | Acoustic Model 122.F Speech Recognition Model 123.F | Acoustic Model 126.F Speech Recognition Model 127.F |
| Action Profile 4 | No | Above 3 mph to 15 mph | Acoustic Model 122.D Speech Recognition Model 123.D | Acoustic Model 126.D Speech Recognition Model 127.E |

As shown in Table 2, four cycling action profiles may be stored in the memory unit 116, each representing a different combination of conditions that, when satisfied, results in the classification of the computing device into a particular action profile. Again, the metrics that represent each action profile may change based upon the type of activity and the relevance of certain metrics for those activities. For example, action profiles 1 and 2 have the same velocity ranges as action profiles 3 and 4, respectively. However, action profiles 1 and 2 correspond to an orientation of the computing device 102 in which the microphone 109 is facing the same direction as the heading of the computing device 102. In other words, the information regarding corresponding speech recognition settings that are to be used in accordance with ASR for action profiles 1 and 2 may compensate for the increased noise environment due to the microphone 109 coupling additional wind noise for this particular orientation of the computing device 102. Again, this is further discussed below with reference to the operation of the trigger speech recognition engine 121 and the command speech recognition engine 125.

To provide yet another example, the computing device 102 may be implemented as a smart watch, which is worn by the user when running. Example action profiles for running may be similar to those represented below in Table 3.

TABLE 3

| Action Profile (Running) | Heart Rate Zone | Steps per minute (Cadence) | Trigger Speech Recognizer Engine 121 | Command Speech Recognizer Engine 125 |
| --- | --- | --- | --- | --- |
| Action Profile 1 | HR Zone 4-5 | 0-150 | Acoustic Model 122.G Speech Recognition Model 123.G | Acoustic Model 126.G Speech Recognition Model 127.G |
| Action Profile 2 | HR Zone 4-5 | Above 150 | Acoustic Model 122.H Speech Recognition Model 123.H | Acoustic Model 126.H Speech Recognition Model 127.H |
| Action Profile 3 | HR Zone 1-3 | 0-150 | Acoustic Model 122.I Speech Recognition Model 123.I | Acoustic Model 126.I Speech Recognition Model 127.I |
| Action Profile 4 | HR Zone 1-3 | Above 150 | Acoustic Model 122.J Speech Recognition Model 123.J | Acoustic Model 126.J Speech Recognition Model 127.J |

As shown in Table 3, four running action profiles may be stored in the memory unit 116, each representing a different combination of conditions that, when satisfied, results in the classification of the computing device into a particular action profile. The running action profiles 1 and 2 have the same cadence ranges as action profiles 3 and 4, respectively. However, action profiles 1 and 2 further include a condition based upon the runner's heart rate zone. Heart rate zone is derived from sensor beats per minute (bpm), along with age and fitness level provided by the runner. In other words, more elite runners may run at a similar cadence as novice runners, but elite runners may be able to do so while maintaining a lower heart rate. As a result, elite runners may be able to maintain the same speech patterns while running at the same rate as novice runners, whereas novice runners may be under more strain and change their speech type (e.g., speech changes due to the Lombard effect, and/or changes to the user's tone, stress, volume, etc.), which may be reliably indicated by the heart rate zone metric. In other words, the speech recognition settings for action profiles 1 and 2 may compensate for changes to the user's speech pattern when under considerable physical strain. This is further discussed below with reference to the operation of the trigger speech recognition engine 121 and the command speech recognition engine 125.

In embodiments, each of the trigger speech recognizer engine 121 and the command speech recognizer engine 125 may implement any suitable number of separate acoustic models (e.g., acoustic models 122.A- . . . and 126.A- . . . ) and speech recognition models (e.g., speech recognition models 123.A- . . . and 127.A- . . . ). In an embodiment, trigger speech recognizer engine 121 and command speech recognizer engine 125 may be implemented as one or more algorithms, software applications, logic and code, etc., that are loaded by the processor unit 104 to perform ASR for different types of speech and/or for different noise environments. To do so, the acoustic models 122 and 126, and the speech recognition models 123 and 127, may be implemented as one or more files, which are executed by the trigger speech recognizer engine 121 and command speech recognizer engine 125 to perform ASR as discussed herein. Thus, although the trigger speech recognizer engine 121 and the command speech recognizer engine 125 each recognize speech using the same overall ASR process, each recognizer may be independently tuned to operate in different noise environments, to interpret different speech patterns, and to use using a different depth and breadth of search to do so.

For example, the trigger speech recognizer engine 121 may be configured to recognize a trigger word or phrase (while rejecting others), whereas the command speech recognizer engine 125 may be configured to recognize command words or phrases. Thus, the trigger speech recognizer engine 121 may implement speech recognition models 123 to facilitate the recognition of a smaller set of words and phrases than the speech recognition models 127 implemented via the command speech recognizer engine 125. In some embodiments, the processor unit 104 may concurrently load the trigger speech recognizer engine 121 and the command speech recognizer engine 125, and use the trigger speech recognizer engine 121 to identify a wake word that, once recognized, signals processor unit 104 to use the command speech recognizer engine 125 to recognize subsequently-received speech. In other embodiments, the processor unit 104 may initially load the trigger speech recognizer engine 121 until a wake word is recognized, and then subsequently load the command speech recognizer engine 125.

As further discussed herein, the trigger speech recognizer engine 121 and/or the command speech recognizer engine 127 may be dynamically configured to adapt to a particular noise environment, changes to a user's speech due to strenuous activity, and/or other factors. Additionally, the command speech recognizer engine 127 may be dynamically configured at runtime in accordance with a particular mode of operation or to control specific settings or sub-menu options. For example, the processor unit 104 may execute the command speech recognizer engine 127 to identify matches to one set of initial commands, which are then narrowed as a user navigates various options, settings, etc., via the VUI.

Furthermore, although FIG. 1 shows the trigger speech recognizer engine 121 and the command speech recognizer engine 125 accessing several locally-stored acoustic and speech recognition models, the embodiments are not limited to such implementations. For example, the trigger speech recognizer engine 121, the command speech recognizer engine 125, the acoustic models 122 and 126, and/or the speech recognition models 123 and 127 may be stored in any suitable device and accessed by the computing device 102 as needed to recognize speech contained in incoming audio. For instance, the trigger speech recognizer engine 121, the command speech recognizer engine 125, the acoustic models 122 and 126, and/or the speech recognition models 123 and 127 may be stored in the one or more backend components 190, and accessed by the computing device 102 in an on-demand manner to perform ASR functions.

In an embodiment, the VUI implemented in accordance with the trigger speech recognizer engine 121 and/or the command speech recognizer engine 125 may control various portions of the computing device 102 to facilitate such external communications. For example, computing device 102 may provide Internet connectivity via communications with communication network 170, as discussed herein. Thus, various functions may be supported in accordance with such communications, such as sharing or uploading images or videos to social media or other online platforms. To do so, once the command speech recognizer engine 125 recognizes the appropriate command associated with this function, the communication unit 106 may temporarily enable communications to the Internet, perform the desired function, and then disable communications. In an embodiment, while a device cannot be handled during time-lapse photography, wireless communications to the Internet (e.g. Wi Fi) may be temporarily enabled by voice command to transfer images to cloud storage, freeing up internal memory to extend the session. In this way, battery power may be conserved by enabling wireless communications only when it is needed. To provide another example, wireless communications may be temporarily enabled to facilitate communications with an external natural language understanding (NLU) service provider (e.g., Amazon's Alexa), which may separately process digital audio or recognized speech that is transmitted via communication unit 106.

Regardless of where the various components of the trigger speech recognizer engine 121 and/or the command speech recognizer engine 125 are stored, embodiments include the acoustic models 122 and 126 representing any suitable number of files, each corresponding to a particular action profile and operating in accordance with one or more acoustic tuning parameters. As a result, the acoustic models 122 and 126, when loaded by the trigger speech recognizer engine 121 and the command speech recognizer engine 125, respectively, correspond to an environment having a unique noise characteristic, as discussed herein.

In embodiments, the acoustic models 122 and 126 may be a statistical representation of particular language's sounds, which are searched and compared to incoming audio received via a microphone 109. In other words, the acoustic models 122 and 126 represent a snapshot of the phonemes of an entire language (e.g., U.S. English) sampled across a large corpus of audio. In doing so, each of the acoustic models 122 and 126 identify how searches are performed based upon training data corresponding to a particular noise environment and/or type of speech. Thus, once an action profile is identified, as discussed above, the processor unit 104 may select a corresponding acoustic model 122 that has been trained in accordance with a noise environment and/or type of speech that matches the noise and/or speech conditions represented by that action profile. The processor unit 104 may then execute the trigger speech recognizer engine 121 to select and search on digital audio provided by the microphone 109 in accordance with that selected acoustic model. This search may be performed in accordance with one or more acoustic tuning parameters, which may be included as part of the selected acoustic model 122, or separately controlled and selected by the processor unit 104. In any event, the selected acoustic model 122, in accordance with its respective acoustic tuning parameters, allow the processor unit 104 to determine a phonetic term associated with each word in received speech to thereby recognize speech.

Similarly, the processor unit 104 may select a corresponding acoustic model 126 based upon the identified action profile, as discussed above, which may be a different (or the same) acoustic model with different (or the same) acoustic tuning parameters used by the trigger speech recognizer engine 121. Thus, once the trigger speech recognizer engine 121 recognizes the wake word, the selected acoustic model 126 (in accordance with its respective acoustic tuning parameters) allow the processor unit 104 to execute the command speech recognizer engine 125 to determine a phonetic term associated with each word in subsequently-received speech, and to recognize this speech. In this way, by selecting an acoustic model corresponding to a unique noise environment, the embodiments allow each independently-selected acoustic model to facilitate the determination of phonetic terms in accordance with a different level of noise tolerance to best suit the environment identified by the action profile.

Once received speech is recognized via the trigger speech recognizer engine 121 or the command speech recognizer engine 125, as the case may be, embodiments include the trigger speech recognizer engine 121 or the command speech recognizer engine 125 determining a meaning for each phonetic term included in the recognized speech by searching a speech recognition model 123 or 127, respectively. In embodiments, speech recognition models 123 and 127 may represent any suitable number of files, with each corresponding to a particular action profile and operating in accordance with one or more speech recognition tuning parameters. As a result, the speech recognition models 123 and 127, when loaded by the trigger speech recognizer engine 121 and the command speech recognizer engine 125, respectively, correspond to a particular breadth and depth of search for specific words and phrases for an identified action profile. In various embodiments, the speech recognition models 123 and 127 may represent files and/or speech recognition tuning parameters that facilitate the trigger speech recognizer engine 121 and the command speech recognizer engine 125 to preform searches in any suitable manner, such as via lists, hierarchies, statistical language models, etc. For example, the speech recognition models 123 and 127 may include phonetic representations of specific words and phrases.

In any event, the speech recognition models 123 and 127, when loaded by the trigger speech recognizer engine 121 and the command speech recognizer engine 125, respectively, cause the processor unit 104 to search the selected speech recognition models for a match to the determined phonetic term (i.e., the recognized speech). Again, this recognized speech may a result of execution of the acoustic models 122 and 126, as discussed above. This search may be performed in accordance with one or more acoustic speech recognition parameters, which may be included as part of the selected speech recognition models 123 and 127, or separately controlled and selected by the processor unit 104. In any event, the selected speech recognition model, in accordance with its respective speech recognition parameters, allow the processor unit 104 to constrain words and phrases to a specific usage (e.g., action camera commands, navigation commands, running watch commands, etc.). In this way, it can be assured with greater confidence that a sequence of phonemes derived from incoming audio matches a specific relevant phrase.

Thus, embodiments include each of trigger speech recognizer engine 121 and command speech recognizer engine 125 selecting one or more of the acoustic models 122 and 126 and/or the speech recognition models 123 and 127 based upon an identified action profile. In particular, the trigger speech recognizer engine 121 and/or the speech recognizer engine 125 may dynamically swap out their respective acoustic models and/or the speech recognition models at runtime based upon an identified action profile.

Moreover, the acoustic tuning parameters and speech recognition parameters discussed herein operate in conjunction with respective acoustic models and speech recognition models to effectuate the operation of the ASR system. Again, in some embodiments, the acoustic tuning parameters and speech recognition parameters may be integrated as part of the acoustic models and speech recognition models, respectively. However, the embodiments are not limited to these examples, and the acoustic tuning parameters and speech recognition parameters may be further tuned or modified in addition to or instead of the respective models with which they are used. Additionally or alternatively, other ASR tuning parameters (i.e., separate from the acoustic tuning parameters and speech recognition parameters) may also be independently adjusted based upon the status data to further adapt the ASR to changes in the state of the computing device 102.

In embodiments, the acoustic tuning parameters, the speech recognition parameters, and the ASR tuning parameters may include any suitable number and/or type of setting, value, or configuration that impacts how the ASR system operates. For example, the ASR tuning parameters may define the leading and trailing silence around spoken words, sensitivity to signals received from microphone 109, beamforming parameters for microphone 109, automatic gain control settings, far talk and near talk settings, isolated versus continuous speech settings, etc. To provide additional examples, the acoustic tuning parameters may define a voice activity detector (VAD) sensitivity level, a VAD speech starting and ending energy thresholds, VAD speech onset window duration, minimum and maximum speech duration, a recognizer engine sensitivity level, a recognizer engine confidence threshold, etc. To provide even more examples, the speech recognition parameters may define a recognizer engine delay (i.e., how long to continue searching after a confident result for a particular phonetic term is identified), an n-best path activation parameter used in conjunction with a particular speech recognition model, an out of vocabulary rejection level, etc.

To provide some illustrative examples using the action profiles discussed above in Tables 1-3, assume that the computing device 102 is implemented as an in-vehicle navigation device, as discussed above with reference to Table 1. Continuing this example, the processor unit 104 may track the status data stored in the memory unit 116 and initially categorize the movement (e.g., vibration, rotation, velocity, etc.) of the computing device 102 into action profile 1, causing the trigger speech recognizer engine 121 to initially load acoustic models 122.A and speech recognition module 123.A, which are associated with matching motion metrics indicating an instantaneous velocity of 5 mph or less. The processor unit 104 may also cause the command speech recognizer engine 125 to initially load an acoustic model 126.A and a speech recognition model 127.A, which are likewise associated with matching motion metrics indicating an instantaneous velocity of 5 mph or less.

Regarding the acoustic models 122.A and 126.A, these may be trained in a noise environment corresponding to the same range of instantaneous velocities (5 mph or less), which is generally a relatively quiet noise environment, with or without the windows being open. In other words, the acoustic models 122.A and 126.A may represent a particular level of noise tolerance based upon the expected noise environment at a particular range of speeds. Moreover, the speech recognition models 123.A and 127.A may correspond to a particular depth and breadth of search associated with the expected output from the acoustic models 122.A and 126.A, respectively. In other words, the speech recognition models 123.A and 127.A may represent a particular phonetic match tolerance for the acoustic models that are used for the range of speeds indicated by the action profile (5 mph or less).

In embodiments, the processor unit 104 may continue to track the status data stored in the memory unit 116 and re-categorize the movement (e.g., vibration, rotation, velocity, etc.) of the computing device 102 into other action profiles based upon the status data. For example, upon the vehicle exceeding a threshold velocity (e.g., 5 mph), the motion of the computing device 102 may be re-categorized into action profile 2. This process may continue for any suitable number of velocity thresholds such that the motion of the computing device 102 is dynamically categorized into a matching action profile based upon the state of the computing device 102, and in turn is matched to various acoustic and speech recognition models.

Continuing the previous example, upon the instantaneous velocity of the computing device 102 further exceeding 5 mph, the processor unit 104 may cause the trigger speech recognizer engine 121 to load acoustic model 122.B and speech recognition module 123.B in place of the previously-loaded acoustic model 122.A and speech recognition module 123.A. Furthermore, the processor unit 104 may also cause the command speech recognizer engine 125 to load acoustic model 126.B and speech recognition module 127.B in place of the previously-loaded acoustic model 126.A and speech recognition module 127.A.

In embodiments, the acoustic models 122.B and 126.B may be trained in a noise environment corresponding to the same range of instantaneous velocities (between 5 and 17 mph), which is an environment associated with a greater amount of noise due to the presence of wind and other driving noise when the vehicle is moving faster than 5 mph. Thus, the acoustic models 122.B and 126.B may represent a particular level of noise tolerance based upon the expected noise environment at that particular range of speeds. By changing the acoustic models as a function of the motion of the computing device 102 in this way, the acoustic tuning parameters associated with the acoustic models 122.B and 126.B may allow the ASR to determine phonetic terms in accordance with a higher level of noise tolerance. Moreover, the speech recognition models 123.B and 127.B may correspond to a different depth and breadth of search associated with the expected output from the acoustic models 122.B and 126.B at this higher range of speeds. In other words, by changing the speech recognition models as a function of the motion of the computing device 102, the speech recognition tuning parameters associated with the speech recognition models 123.B and 127.B may allow the ASR to provide a higher phonetic match tolerance, which allows for a higher depth and breadth of search for a match to a determined phonetic term output by the acoustic models.

In embodiments, the acoustic tuning parameters associated with each of the acoustic models 122 and 126 may facilitate different levels of noise tolerance for different anticipated noise environments. Moreover, the speech recognition tuning parameters associated with each of the speech recognition models 123 and 127 may facilitate a different level of phonetic match tolerance for a particular noise environment to adapt to the expected outputs of the acoustic models in these same noise environments.

In this way, the trigger speech recognizer engine 121 and the command speech recognizer engine 125 may be independently tuned based upon the particular noise environment, as indicated by acoustic models and speech recognition models that are matched to identified action profiles via the aforementioned motion metrics. Thus, the embodiments advantageously allow for the independent optimization of the trigger speech recognizer engine 121 and the command speech recognizer engine 125 such that FAs and FRs may be minimized in both cases based upon the needs of each individual engine, the current noise environment, and/or other factors.

To provide an additional illustrative example with reference to Table 2, other factors may impact the noise environment in addition to the motion of the computing device 102, such as the orientation of the computing device 102. Thus, embodiments include the processor unit 104 dynamically adjusting the acoustic models 122 and 126 and/or the speech recognition models 123 and 127 utilized by the trigger speech recognizer engine 121 and the command speech recognizer engine 125 based upon changes in the orientation, motion, and/or state of the computing device 102. Continuing the example from Table 2, the processor unit 104 may track the status data stored in the memory unit 116 and initially categorize the movement (e.g., vibration, rotation, velocity, etc.) and orientation of the computing device 102 into action profile 1, causing the trigger speech recognizer engine 121 to initially load acoustic models 122.D and speech recognition module 123.D. The processor unit 104 may also cause the command speech recognizer engine 125 to initially load an acoustic model 126.D and a speech recognition model 127.D.

However, the processor unit 104 may continue to track the status data and dynamically change one or more of the acoustic models 122, acoustic models 123, speech recognition models 126, and/or speech recognition models 127 when the status data indicates changes in the orientation and/or motion of the computing device 102. For instance, the microphone 109 may initially face forward on the handlebars and be aligned with the cyclist's direction of travel, causing the processor 104 to categorize the computing device 102 into one of action profiles 1 or 2 (further depending on the measured speed indicated by the status data). As a result, the corresponding acoustic models and speech recognition models may be loaded in anticipation of the additional wind noise caused by this particular orientation and speed of the computing device 102. But, if the computing device is subsequently moved to the cyclist's helmet facing backward, this may no longer be the case, resulting in the processor 104 re-categorizing the computing device 102 into one of action profiles 3 or 4 (further depending on the measured speed indicated by the status data).

To provide yet another illustrative example with reference to Table 3, in addition to changes to the noise environment, some activities may also cause changes to the user's type of speech, such as strenuous exercise. In particular, a user's speech may change while under physical exertion, resulting in increased volume in accordance with the Lombard effect, changes in pitch, the person being out of breath, etc. Thus, embodiments include the processor unit 104 dynamically adjusting the acoustic models 122 and 126 and/or the speech recognition models 123 and 127 utilized by the trigger speech recognizer engine 121 and the command speech recognizer engine 125 based upon changes in perceived physical exertion of the user and/or the particular type of activity that is detected. In doing so, acoustic models 122 and 126 and/or the speech recognition models 123 and 127 may be selected to anticipate changes in user's speech, and recognize speech via acoustic model tuning parameters and/or speech recognition tuning parameters that have been specifically trained for the type of speech that matches the activity identified in that action profile.

Continuing the example from Table 3, the processor unit 104 may track the status data stored in the memory unit 116 and determine that a user is running at a cadence of 125 steps-per-minute and has a heart rate zone 1-3 (below 125 bpm)(action profile 3), representing a level of activity not likely to significantly impact the user's speech. Thus, the processor unit 104 may initially categorize the movement (e.g., vibration, rotation, velocity, etc.) of the computing device 102 and the user's strain into action profile 3, causing the trigger speech recognizer engine 121 to initially load acoustic models 122.I and speech recognition module 123.I. The processor unit 104 may also cause the command speech recognizer engine 125 to initially load an acoustic model 126.I and a speech recognition model 127.I. But if the runner continues to run at this pace, he may eventually reach a heart rate that exceeds zone 1-3 (above 125 bpm). At this point, the processor 104 may categorize the computing device 102 into action profile 1, and load the corresponding acoustic models 122 and 126 and/or the speech recognition models 123 and 127 for the trigger speech recognizer engine 121 and the command speech recognizer engine 125 (e.g., acoustic models 122.G and 126.G and speech recognition models 123.G and 127.G) to adapt to the anticipated changes in the user's speech due to this additional exertion.

In various embodiments, the processor unit 104 may control the state of the microphone 109 to further leverage the advantages of the trigger speech recognizer 121 and/or the command speech recognizer 125, as discussed herein. For example, conventional speech recognition systems require trailing and leading silence around spoken words to effectively recognize them. However, because the embodiments herein optimize the trigger speech recognizer engine 121 and the command speech recognizer engine 125 to adapt to a wide variety of noise environments, a leading and/or trailing silence is not needed to effectively recognize speech. Thus, embodiments include the processor unit 104 controlling the state of a microphone 109 included in the sensor array to maintain the microphone 109 in an operating state such that audio input is continuously received.

Furthermore, although the action profiles may be used as a primary means by which to select the acoustic models and the speech recognition models, the microphone 109 may still be used to verify the presence of wind noise and to ensure that the current acoustic models and the speech recognition models are properly selected. For instance, audio received from microphone 109 may be analyzed periodically to test the noise environment, and to confirm that the noise environment is within an expected range that matches the selected acoustic models and speech recognition models.

The examples discussed herein describe some of the techniques used to adapt the trigger speech recognizer 121 and/or the command speech recognizer 125 to various noise environments, changes in a user's speech, the orientation of the computing device 102, the physical state of the computing device 102, etc. However, the embodiments described herein are not limited to these examples, and the trigger speech recognizer 121 and/or the command speech recognizer 125 may be adapted in accordance with any suitable number and/or type of detectable changes that may impact how speech is recognized. For example, the acoustic models 122 and 126 and/or the speech recognition models 123 and 127 may be trained in accordance with specific mounting configurations of the computing device 102, specific cases in which the computing device 102 may be placed, etc. In accordance with such embodiments, the trigger speech recognizer 121 and/or the command speech recognizer 125 may load corresponding acoustic models 122 and 126 and/or the speech recognition models 123 and 127 that are trained in accordance with similar conditions, thereby ensuring accurate speech recognition when such changes occur.

Furthermore, although not considered in the example action profiles shown in Tables 1-3 and discussed above for purposes of brevity, additional metrics or other factors may impact the noise environment and/or the user's speech in various ways. These may be detected via one or more sensors included in the sensor array 110, received via one or more external sensors 150, and/or otherwise identified by the computing device 102. For instance, the action profiles may include motion metrics such as vibration, acceleration, rotation, rate of ascent or descent, etc., which may also be indicative of changes in the state of the computing device 102 that cause changes in the operating noise environment.

Moreover, other external factors may be present that impact the noise environment, such as external wind speed (not device speed), temperature, and humidity, which affect sound propagation and absorption, which may be represented as environmental metrics. To provide another example, for in-vehicle usage, vehicle metrics may be collected via an on-board diagnostic (OBD) system such as revolutions-per minute (RPM), load, etc. This data may be obtained, for instance, via one or more external sensors 150, which may be implemented to communicate information from the vehicle's OBD-II port.

Still further, other metrics may indicate changes in a user's physical exertion or stress, which may alter the user's speech patterns in different way, as discussed herein. The user's heart rate and cadence, as discussed in the example with reference to Table 3, are examples of some of these exertion metrics. However, additional exertion metrics may include, for instance, breathing rate, power output, etc., which also indicate a strain to the vocal tract, and thus also affect the user's speech.

Thus, embodiments include the computing device 102 storing or otherwise accessing any suitable number of action profiles, which may include any suitable number and/or type of metrics (e.g., motion, environmental, exertion, etc.) that may impact the operating noise environment and/or the user's speech. In doing so, the embodiments also include the processor unit 104 categorizing the computing device 102 into any one of these particular action profiles. In doing so, the computing device 102 may compensate for these changes to the noise environment and/or the user's speech by correlating specifically-tuned acoustic models, acoustic tuning parameters, speech recognition models, speech recognition tuning parameters, ASR parameters, etc., to identified action profiles.

The illustrative examples shown in Tables 1-3 include specific acoustic models and speech recognition models selected for particular action profiles. However, embodiments include one or more of the acoustic models, the speech recognition models, the acoustic tuning parameters, the speech recognition tuning parameters, and/or the ASR tuning parameters being independently adjusted for any selected action profile. Moreover, one or more of the acoustic models, the speech recognition models, the acoustic tuning parameters, the speech recognition tuning parameters, and/or the ASR tuning parameters may separately be adjusted for the trigger speech recognizer engine 121 and the command speech recognizer engine 125.

Figure 2:
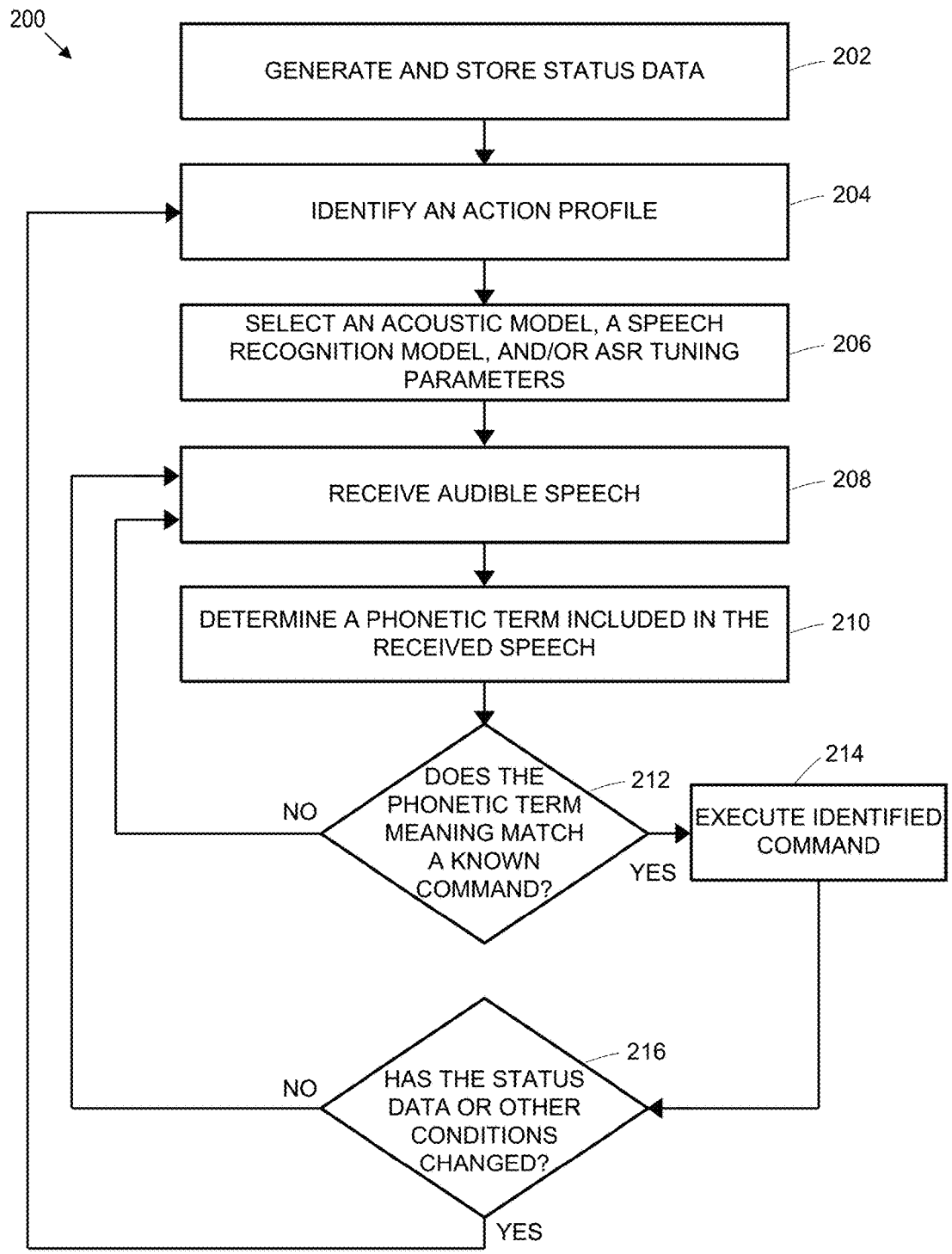
FIG. 2 is a flowchart 200 for recognizing and executing a computing device function in response to receiving audible speech, in accordance with embodiments of the technology.

FIG. 2 is a flowchart 200 for recognizing and executing a computing device function in response to receiving audible speech, in accordance with embodiments of the technology. In various embodiments, the flowchart 200 may be synonymous with a method 200, and one or more regions of the method 200 (or the entire method 200) may be implemented by any suitable device. For example, one or more regions of method 200 may be performed by computing device 102, as shown in FIG. 1 (e.g., via processor unit 104 executing the trigger speech recognizer engine 121 and the command speech recognizer engine 125). To provide another example, one or more regions of method 200 may be performed by one or more backend computing devices 190, as shown in FIG. 1. In embodiments, the method 200 represents calculations or other operations that are performed to execute a computing device function based upon recognized speech.

Method 200 may begin with one or more processors generating and storing status data (block 202). This may include, for example, the computing device 102 continuously or periodically generating status data from various data sources, and storing the status data in any suitable portion of memory unit 116 or other suitable storage device (block 202). Again, this status data may include, for example, geographic location data generated by location determining component 112, sensor data such as, for example, biometric and/or motion data generated by one or more sensors included in sensor array 110 and/or one or more external sensors 150, etc. (block 202).

Method 200 may include one or more processors identifying an action profile based upon the stored status data (block 204). This may include, for example, identifying an action profile using one or more matching metric that may indicate the physical state of the computing device 102, a particular user activity, and/or a state of the user while using the computing device 102 (block 204).

Method 200 may include one or more processors selecting one or more of an acoustic model, a speech recognition model, and ASR tuning parameters based upon the identified (block 204) action profile (block 206). Again, the acoustic model may include one or more acoustic tuning parameters (or these acoustic tuning parameters may be separate from the acoustic model) that are tuned for a particular noise environment and/or type of speech associated with the identified (block 204) action profile, as discussed herein (block 206). Moreover, the speech recognition model may include one or more speech recognition tuning parameters (or these speech recognition tuning parameters may be separate from the speech recognition model), as discussed herein (block 206). These speech recognition tuning parameters may be tuned for a specific phonetic match tolerance associated with the selected acoustic model, and may represent a particular depth and breadth of phonetic term search (block 206). Still further, the ASR tuning parameters may include additional or alternative tuning parameters to further affect ASR functionality based upon the identified action profile, as discussed herein (block 206).

Method 200 may include one or more processors receiving audible speech (block 208). This may include, for example, the computing device 102 receiving audio signals via a microphone 109 (block 208). These analog audio signals may include words and phrases spoken by the user, which are converted into a digital representation of the received audio that may be implemented in accordance with ASR processing (block 208).

Method 200 may include one or more processors determining a phonetic term included in the received speech (block 210). This may include, for example, executing the trigger speech recognizer module 121 or the command speech recognizer module 125 to determine a phonetic term associated a word included in the received speech based on the selected acoustic model, selected acoustic tuning parameters, and/or ASR tuning parameters, as discussed herein (block 210). In an embodiment, this may result in the computing device 102 generating a digital representation of a spoken word or phrase that was contained in the audible speech (block 210).

Method 200 may include one or more processors determining whether the identified phonetic term (e.g., a word or phrase) matches a known command (block 212). This may include, for example, executing the trigger speech recognizer module 121 or the command speech recognizer module 125 to determine a meaning for the determined (block 210) phonetic term (block 212). For example, the execution of the trigger speech recognizer module 121 or the command speech recognizer module 125 may include searching the selected speech recognition model for a match to a particular meaning of the determined phonetic term in the received speech (block 212). Again, this may be performed in accordance with the selected speech recognition tuning parameters and/or ASR tuning parameters, as discussed herein (block 212). If the phonetic term meaning is identified as matching a known command, then method 200 may include one or more processors executing the corresponding command (block 214). If, however, the determined meaning does not match a known command, the term may be "rejected," and the method 200 may continue to analyze subsequently-received audible speech (block 208).

Once the command has been executed (block 214), method 200 may include one or more processors determining whether the status data or other conditions have changed (block 216). This may include, for example, analyzing the stored status data to determine whether a significant change has occurred to warrant re-categorizing the computing device into a new action profile (block 204). For example, one or more metrics included in the status data may be compared to various respective thresholds, as discussed above with respect the example action profiles in Tables 1-3, to determine whether the current action profile should be changed (block 204). If so, then the method 200 may include one or more processors repeating the selection of an acoustic model, acoustic tuning parameters, a speech recognition model, speech recognition parameters, ASR tuning parameters, etc., for the changed action profile, as discussed herein (block 206). Moreover, the method 200 may then include one or more processors continuing to receive audible speech (block 208), determine a phonetic term (block 210), determining whether the phonetic term matches a known command (block 212), executing the identified command (block 214), etc. In this way, the method 200 may be repeated any suitable number of times to continuously and dynamically recognize words within speech and to adapt to changes in the noise environment, types of speech, the state of the computing device 102, etc.

To provide another example, the method 200 may include one or more processors determining that the recognizer engine should be changed (block 216). For instance, if the phonetic term meaning is associated with a wake word (block 212), then the executed command (block 214) may include recognizing subsequently-received speech in accordance with the command recognizer engine 125 as opposed to the trigger recognizer engine 121 (block 216). As a result, regardless of whether the action profile changes, the method 200 may include one or more processors loading a new acoustic model, acoustic tuning parameters, a speech recognition model, speech recognition parameters, ASR tuning parameters, etc., in accordance with the command speech recognizer 125. In this way, the trigger recognizer engine 121 and the command recognizer engine 125 may be optimized independently.

Figure 3:
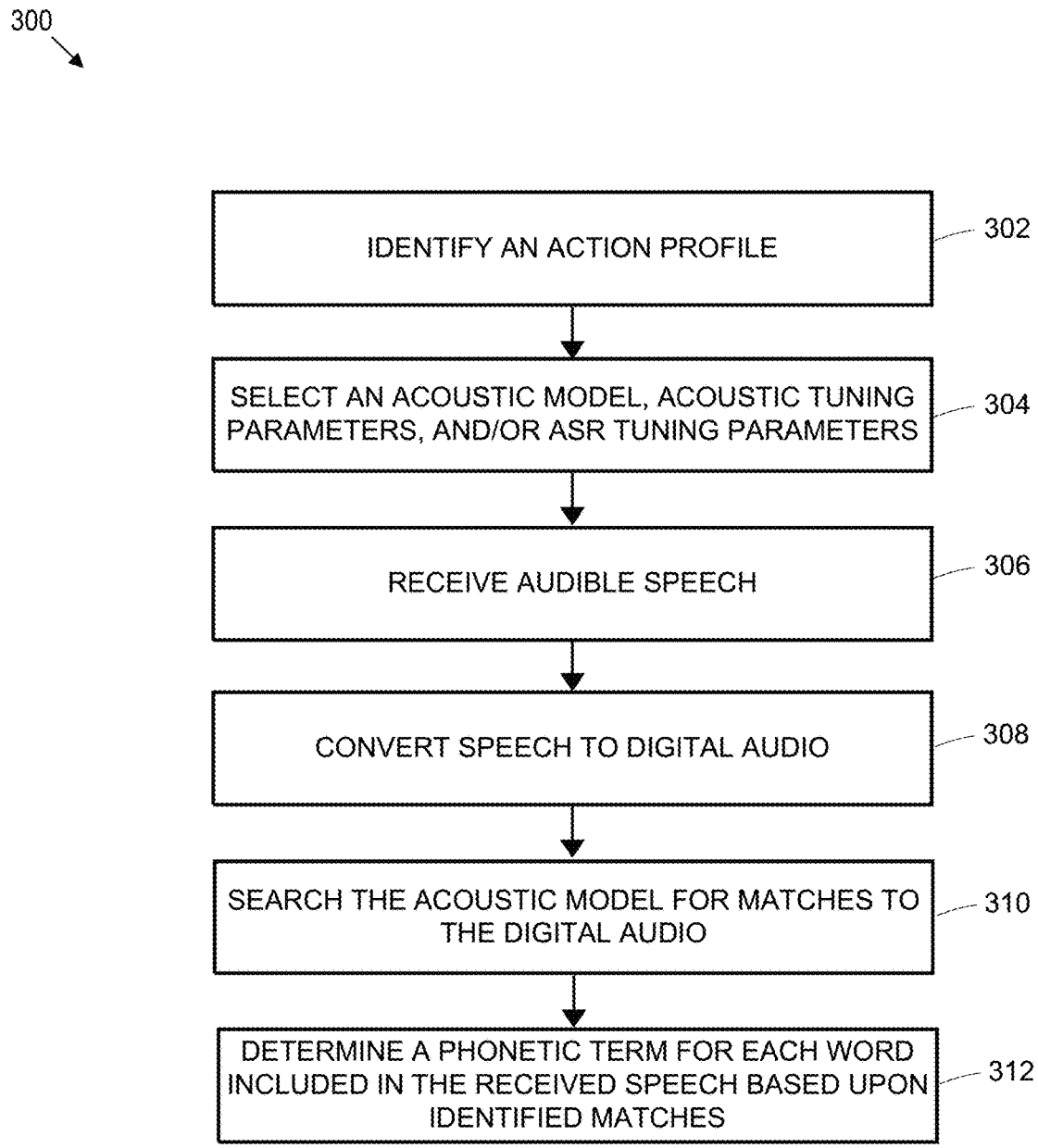
FIG. 3 is a flowchart 300 for determining a phonetic term associated with a word contained in received audible speech, in accordance with embodiments of the technology.

FIG. 3 is a flowchart 300 for determining a phonetic term associated with a word contained in received audible speech, in accordance with embodiments of the technology. In various embodiments, the flowchart 300 may be synonymous with a method 300, and one or more regions of the method 300 (or the entire method 300) may be implemented by any suitable device. For example, as in the flowchart 200, one or more regions of method 300 may be performed by computing device 102, as shown in FIG. 1 (e.g., via processor unit 104 executing the trigger speech recognizer engine 121 and the command speech recognizer engine 125). To provide another example, one or more regions of method 300 may be performed by one or more backend computing devices 190, as shown in FIG. 1. In embodiments, the method 300 represents calculations or other operations that are performed to recognize a phonetic term contained within received speech.

Method 300 may include one or more processors identifying an action profile based upon stored status data (block 302). This may include, for example, identifying an action profile using one or more matching metrics that may indicate the physical state of the computing device 102, a particular user activity, and/or a state of the user while using the computing device 102 (block 302).

Method 300 may include one or more processors selecting an acoustic model, acoustic tuning parameters, and/or ASR tuning parameters based upon the identified action profile (block 304). Again, the acoustic model may include one or more acoustic tuning parameters (or these acoustic tuning parameters may be separate from the acoustic model) that are tuned for a particular noise environment and/or type of speech associated with the identified action profile, as discussed herein (block 304).

Method 300 may include one or more processors receiving audible speech (block 306). This may include, for example, the computing device 102 receiving audio signals via a microphone 109 (block 306). This audible speech may contain one or more words or phrases that may be spoken by a user when interacting with the computing device 102 via a VUI (block 306).

Method 300 may include one or more processors converting analog audio signals received via the microphone 109 into a digital representation of the received audio (block 308). This may include, for example, converting the analog audio via any suitable number and/or type of analog-to-digital converters, or other suitable hardware and/or software implemented via the computing device 102 (block 308).

Method 300 may include one or more processors searching the acoustic model for matches to the digital audio (block 310). This may include, for example, searching the acoustic model in accordance with the particular acoustic tuning parameters and/or ASR tuning parameters, which are tailored to the particular noise environment and/or type of speech associated with the identified action profile (block 310).

Method 300 may include one or more processors determining a phonetic term for each word included in the received speech based upon the result of the search using the selected acoustic model (block 312). This may include, for instance, identifying individual sequential phonemes that are identified as a result of the search in accordance with the acoustic model, and identifying, from these sequences, the phonetic terms associated with words or phrases included in the received speech (block 312).

Figure 4:
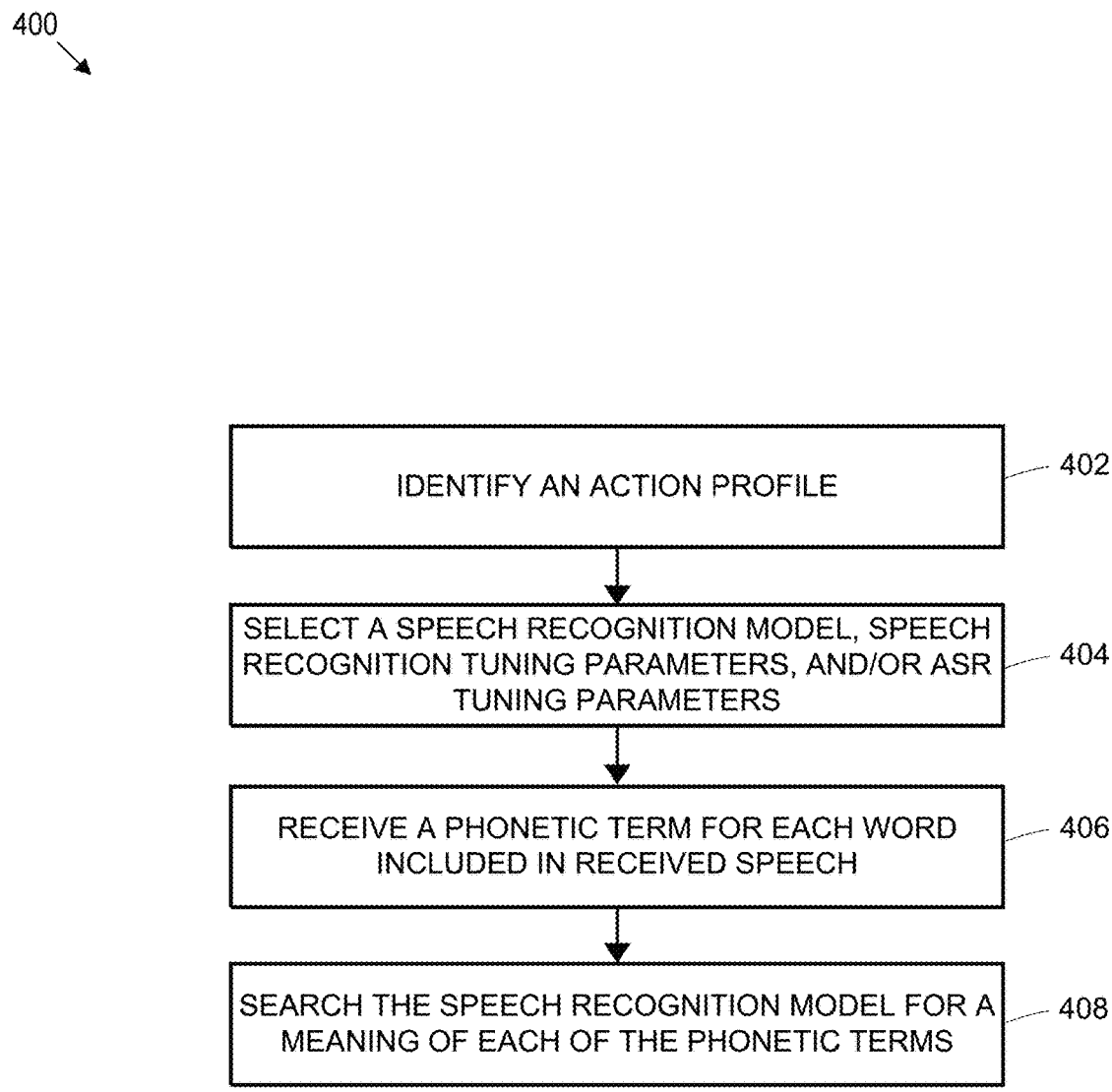
FIG. 4 is a flowchart 400 for determining the meaning of a determined phonetic term contained in received audible speech, in accordance with embodiments of the technology.

FIG. 4 is a flowchart 400 for determining the meaning of a determined phonetic term contained in received audible speech, in accordance with embodiments of the technology. In various embodiments, the flowchart 400 may be synonymous with a method 400, and one or more regions of the method 400 (or the entire method 400) may be implemented by any suitable device. For example, as in the flowchart 300, one or more regions of method 400 may be performed by computing device 102, as shown in FIG. 1 (e.g., via processor unit 104 executing the trigger speech recognizer engine 121 and the command speech recognizer engine 125). To provide another example, one or more regions of method 300 may be performed by one or more backend computing devices 190, as shown in FIG. 1. In embodiments, the method 400 represents calculations or other operations that are performed to recognize the meaning of an identified phonetic term contained within received speech.

Method 400 may include one or more processors identifying an action profile based upon stored status data (block 402). This may include, for example, identifying an action profile using one or more matching metrics that may indicate the physical state of the computing device 102, a particular user activity, and/or a state of the user while using the computing device 102 (block 402).

Method 400 may include one or more processors selecting an speech recognition model, speech recognition tuning parameters, and/or ASR tuning parameters based upon the identified (block 402) action profile (block 404). Again, the speech recognition model may include one or more speech recognition tuning parameters (or these speech recognition tuning parameters may be separate from the speech recognition model) that are tuned for a particular phonetic match tolerance, with a higher phonetic match tolerance resulting in a higher depth and breadth of search to specific phonetic terms, as discussed herein (block 404).

Method 400 may include one or more processors receiving a phonetic term for each word included in the received speech (block 406). These received phonetic terms may include, for example, the output from an acoustic model, as discussed with reference to FIG. 3 above and elsewhere herein (block 406).

Method 400 may include one or more processors determining a meaning of each of the phonetic terms included in the received speech by searching the selected speech recognition model in accordance with the speech recognition parameters and/or ASR tuning parameters (block 408). This may include, for example, searching the speech recognition model in accordance with the particular the speech recognition tuning parameters and/or ASR tuning parameters, which are tailored to the particular outputs that are generated by the acoustic model (block 408). As a result, phonetic terms that match known commands may be readily identified (block 408). Again, once a known command is identified in this manner, the computing device 102 may execute the corresponding command.

Some of the Figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

Having thus described various embodiments of the technology, what is claimed as new and desired to be protected by Letters Patent includes the following:

What is claimed is:
1. A computing device, comprising:
 a location-determining component configured to receive location signals and to generate geographic location data based on the received location signals;
 a sensor array configured to generate sensor data indicative of movement of the computing device;
 a memory configured to store a plurality of acoustic models and a plurality of speech recognition models to facilitate speech recognition, each acoustic model from among the plurality of acoustic models being associated with one or more acoustic tuning parameters corresponding to an environment with a unique noise characteristic, and each speech recognition model from among the plurality of speech recognition models being associated with a phonetic match tolerance;
 a processor unit coupled with the location-determining component, the sensor array, and the memory, the processor unit configured to:
  receive audible speech including a plurality of words;
  identify an action profile based on one or more of the geographic location data and the sensor data;
  select an acoustic model and a speech recognition model from among the plurality of acoustic models and speech recognition models based on the identified action profile;
  determine a phonetic term associated with each word in the received speech based on the selected acoustic model's acoustic tuning parameters to recognize speech;
  determine a meaning for each determined phonetic term by searching the selected speech recognition model for a match to the determined phonetic term, and
  execute a computing device function based on the determined meaning for each word within the received audible recognized speech.

2. The computing device of claim 1, wherein the processor unit is further configured to select a speech recognition model from among the plurality of speech models having a higher phonetic match tolerance when the action profile indicates movement of the computing device in excess of a predetermined movement threshold, the higher phonetic match tolerance resulting in a higher depth and breadth of search for a match to the determined phonetic term.

3. The computing device of claim 1, wherein the action profile indicates an instantaneous velocity of the computing device, and
    wherein the processor unit is further configured to select an acoustic model and a speech recognition model based on the instantaneous velocity of the computing device.

4. The computing device of claim 3, wherein:
    each acoustic model from among the plurality of acoustic models is associated with a predetermined range of computing device velocities,
    each speech recognition model from among the plurality of speech recognition models is associated with a predetermined range of computing device velocities, and
    the processor unit is further configured to select an acoustic model and a speech recognition model having a respective predetermined range of velocities associated with the instantaneous velocity of the computing device.

5. The computing device of claim 1, wherein the action profile indicates an orientation of the computing device, and
    wherein the processor unit is further configured to select an acoustic model and a speech recognition model based on the orientation of the computing device.

6. The computing device of claim 1, wherein the one or more acoustic tuning parameters associated with each acoustic model from among the plurality of acoustic models facilitates the determination of phonetic terms in accordance with a different level of noise tolerance.

7. The computing device of claim 1, wherein the acoustic model is trained in accordance with a type of speech resulting from a user performing a type of physical activity matching the identified action profile.

8. The computing device of claim 1, wherein the plurality of acoustic models and the plurality of speech recognition models facilitate speech recognition in accordance with a trigger speech recognizer that facilitates speech recognition of a wake word, and a command speech recognizer that facilitates speech recognition of computing device commands once the wake word is recognized, and
    wherein the processor unit is further configured to independently select an acoustic model and a speech recognition model for each of the trigger speech recognizer and the command speech recognizer.

9. The computing device of claim 1, further comprising:
    wherein the processor unit is further configured to control a microphone to receive the audible speech, and to maintain the microphone in an operating state such that audio input is continuously received via the microphone.

10. An action camera, comprising:
    a location-determining component configured to receive location signals and to generate geographic location data based on the received location signals;
    a sensor array configured to generate sensor data indicative of movement of the action camera;
    a memory configured to store a plurality of speech recognition models and a plurality of acoustic models to facilitate speech recognition,
    wherein each acoustic model from among the plurality of acoustic models is associated with one or more acoustic tuning parameters corresponding to an environment with a unique noise characteristic for a predetermined range of action camera velocities, and
    wherein each speech recognition model from among the plurality of speech recognition models is associated with a phonetic match tolerance for a predetermined range of action camera velocities, and
    a processor unit coupled with the location-determining component, the sensor array, and the memory, the processor unit configured to:
        receive audible speech including a plurality of words;
        calculate an instantaneous velocity of the action camera based on one or more of the geographic location data and the sensor data;
        select an acoustic model and a speech recognition model from among the plurality of acoustic models and speech recognition models having a respective predetermined range of action camera velocities that encompass the instantaneous velocity of the action camera;
        determine a phonetic term associated with each word in the received speech based on the selected acoustic model's acoustic tuning parameters to recognize speech;
        determine a meaning for each determined phonetic term by searching the selected speech recognition model for a match to the determined phonetic term, and
        execute a computing device function based on the determined meaning for each word within the received audible recognized speech.

11. The action camera of claim 10, wherein the sensor array includes one or more of an accelerometer, a gyroscope, a magnetometer, and a barometer.

12. The action camera of claim 10, wherein the action profile indicates an orientation of the computing device, and
    wherein the processor unit is further configured to select an acoustic model and a speech recognition model based on the orientation of the computing device.

13. The action camera of claim 10, wherein the processor unit is further configured to select a speech recognition model from among the plurality of speech models having a higher phonetic match tolerance when the action profile indicates movement of the action camera in excess of a predetermined movement threshold, the higher phonetic match tolerance resulting in a higher depth and breadth of search for a match to the determined phonetic term.

14. The action camera of claim 10, wherein the acoustic model is trained in accordance with a type of speech resulting from a user performing a type of physical activity matching the instantaneous velocity of the action camera.

15. The action camera of claim 10, wherein the action profile indicates an orientation of the action camera, and
    wherein the processor unit is further configured to select an acoustic model and a speech recognition model based on the orientation of the action camera.

16. A tangible, non-transitory, computer-readable medium storing instructions on a computing device that, when executed by one or more processors associated with the computing device, cause the computing device to:
    access stored geographic location data and stored sensor data that are indicative of a tracked movement of the computing device;
    identify an action profile associated with the computing device based on one or more of the geographic location data and the sensor data;
    select a stored acoustic model that is associated with one or more acoustic tuning parameters corresponding to an environment with a unique noise characteristic;

select a stored speech recognition model that is associated with one or more speech recognition tuning parameters corresponding to a phonetic match tolerance;

modify the one or more acoustic tuning parameters and the one or more speech recognition tuning parameters based upon the identified action profile;

receive audible speech including a plurality of words;

determine a phonetic term associated with each word in the received speech based on the selected acoustic model's modified acoustic tuning parameters to recognize speech;

determine a meaning for each determined phonetic term by searching the selected speech recognition model based on the selected speech recognition's modified speech recognition tuning parameters for a match to the determined phonetic term, and execute a computing device function based on the determined meaning for each word within the received audible recognized speech.

17. The tangible, non-transitory, computer-readable medium of claim 16, wherein the instructions to select an acoustic model and a speech recognition further include instructions that, when executed by the one or more processors, cause the computing device to select an acoustic model and a speech recognition model based on the instantaneous velocity of the computing device.

18. The tangible, non-transitory, computer-readable medium of claim 17, wherein:

each acoustic model from among the plurality of acoustic models is associated with a predetermined range of computing device velocities, each speech recognition model from among the plurality of speech recognition models is associated with a predetermined range of computing device velocities, and the instructions to select an acoustic model and a speech recognition further include instructions that, when executed by the one or more processors, cause the computing device to select an acoustic model and a speech recognition model having a respective predetermined range of velocities associated with the instantaneous velocity of the computing device.

19. The tangible, non-transitory, computer-readable medium of claim 16, wherein the instructions to select a speech recognition further include instructions that, when executed by the one or more processors, cause the computing device to select a speech recognition model from among the plurality of speech models having a higher phonetic match tolerance when the action profile indicates movement of the computing device in excess of a predetermined movement threshold, the higher phonetic match tolerance resulting in a higher depth and breadth of search for a match to the determined phonetic term.

20. The tangible, non-transitory, computer-readable medium of claim 16, wherein the one or more acoustic tuning parameters associated with each acoustic model from among the plurality of acoustic models facilitates the determination of phonetic terms in accordance with a different level of noise tolerance.

* * * * *